US007813588B2

(12) United States Patent
Bradburn

(10) Patent No.: US 7,813,588 B2
(45) Date of Patent: Oct. 12, 2010

(54) ADJUSTING SOURCE IMAGE DATA PRIOR TO COMPRESSING THE SOURCE IMAGE DATA

(75) Inventor: Brent M. Bradburn, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 837 days.

(21) Appl. No.: 11/796,638

(22) Filed: Apr. 27, 2007

(65) Prior Publication Data
US 2008/0267529 A1    Oct. 30, 2008

(51) Int. Cl.
*G06K 9/36* (2006.01)
*G06K 9/46* (2006.01)

(52) U.S. Cl. ........................................ 382/282

(58) Field of Classification Search ............... 382/162, 382/164–167, 176, 190, 232, 233, 237, 240, 382/243, 244, 246, 250, 251, 254, 270, 274, 382/282, 298–300; 345/606; 358/1.16, 1.2, 358/3.13, 453, 537, 538
See application file for complete search history.

(56) References Cited

U.S. PATENT DOCUMENTS

| 5,539,842 | A | 7/1996 | Schwartz |
| 5,850,484 | A | 12/1998 | Beretta et al. |
| 5,892,847 | A | 4/1999 | Johnson |
| 6,201,614 | B1* | 3/2001 | Lin ........................... 358/3.13 |
| 6,208,762 | B1* | 3/2001 | Garland et al. .............. 382/254 |
| 6,259,810 | B1* | 7/2001 | Gill et al. .................... 382/166 |
| 6,625,323 | B2 | 9/2003 | Henderson et al. |
| 6,834,127 | B1* | 12/2004 | Yamamoto .................. 382/282 |
| 7,058,234 | B2* | 6/2006 | Gindele et al. .............. 382/274 |
| 7,133,490 | B2 | 11/2006 | Muller et al. |
| 7,269,292 | B2* | 9/2007 | Steinberg .................... 382/243 |
| 7,324,246 | B2* | 1/2008 | Enomoto .................... 358/538 |
| 2003/0025712 | A1* | 2/2003 | Corr ........................... 345/606 |
| 2004/0165785 | A1 | 8/2004 | Monobe et al. |
| 2005/0089215 | A1 | 4/2005 | Staelin et al. |
| 2005/0117807 | A1 | 6/2005 | Shohdohji |
| 2008/0019565 | A1* | 1/2008 | Steinberg .................... 382/103 |
| 2008/0267529 | A1* | 10/2008 | Bradburn .................... 382/282 |

FOREIGN PATENT DOCUMENTS

JP          2000307867       11/2000

* cited by examiner

*Primary Examiner*—Amir Alavi

(57) ABSTRACT

Embodiments of image processing are described that include receiving source image data including a range of values having endpoints, adjusting the source image data by treating at least one subset of endpoint data differently from data having midrange values, where adjusting the source image data is performed prior to compressing the source image data, and restoring a range of values between the endpoint data values after decompressing image data to maintain the midrange data values substantially unadjusted.

7 Claims, 12 Drawing Sheets

| 8 | 6 | 5 | 8 | 12 | 20 | 26 | 31 |
| 6 | 6 | 7 | 10 | 13 | 29 | 30 | 28 |
| 7 | 7 | 8 | 12 | 20 | 29 | 35 | 28 |
| 7 | 9 | 11 | 15 | 26 | 44 | 40 | 31 |
| 9 | 11 | 19 | 28 | 34 | 55 | 52 | 39 |
| 12 | 18 | 28 | 32 | 41 | 52 | 57 | 46 |
| 25 | 32 | 39 | 44 | 52 | 61 | 60 | 51 |
| 36 | 46 | 48 | 49 | 56 | 50 | 52 | 50 |

QUANTIZATION TABLE

| 9 | 7 | 6 | 9 | 14 | 23 | 29 | 35 |
| 7 | 7 | 8 | 11 | 15 | 33 | 34 | 32 |
| 8 | 8 | 9 | 14 | 23 | 33 | 39 | 32 |
| 8 | 10 | 12 | 17 | 29 | 50 | 45 | 35 |
| 10 | 12 | 21 | 32 | 38 | 62 | 59 | 44 |
| 14 | 20 | 32 | 36 | 46 | 59 | 64 | 52 |
| 28 | 36 | 44 | 50 | 59 | 69 | 68 | 57 |
| 41 | 52 | 54 | 55 | 63 | 56 | 59 | 56 |

DEQUANTIZATION TABLE

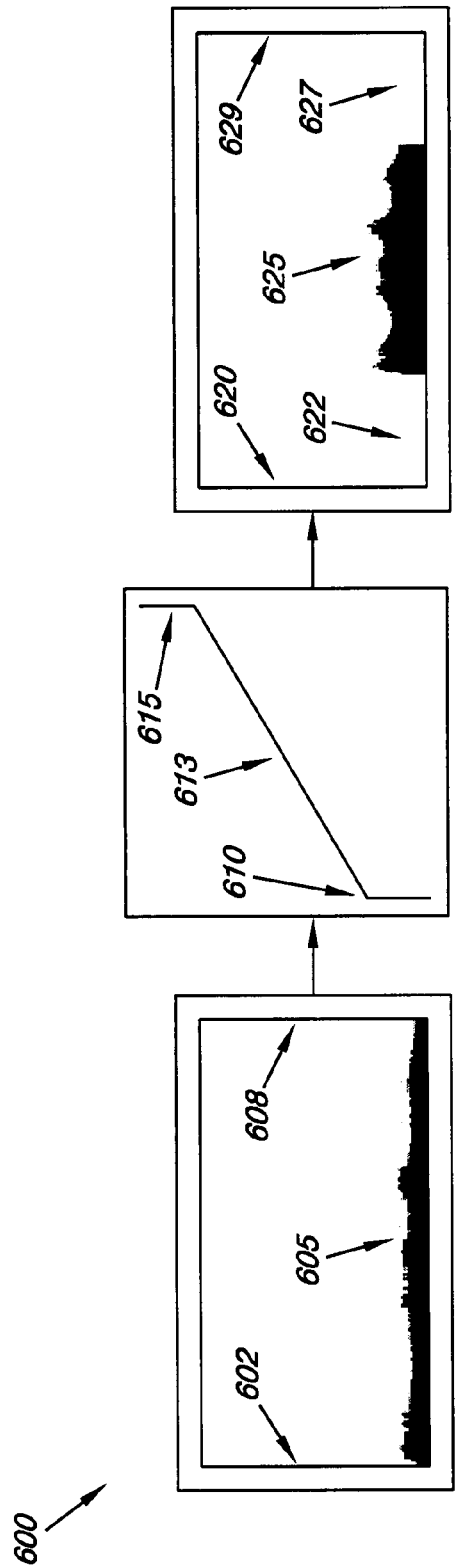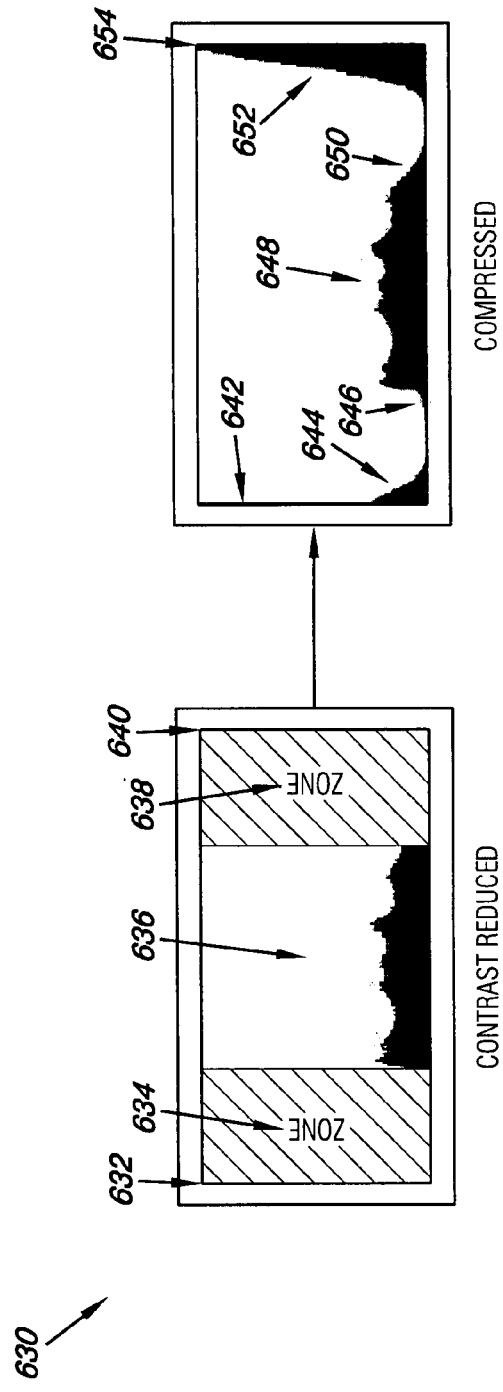
Fig. 6A
Fig. 6B

ADJUSTING SOURCE IMAGE DATA PRIOR TO COMPRESSING THE SOURCE IMAGE DATA

Processing of original image data using a number of compression techniques intended to reduce size of saved image files may result in artifacts becoming apparent in a decompressed image. Such artifacts can reduce output image quality. In particular, compression and decompression of a set of endpoint data values in an image (e.g., endpoint white and/or endpoint black pixels) can affect an average data value and result in a wider range for such values. Widening a range for endpoint values can introduce artifacts in an image that become more apparent when a block of pixels having endpoint values at one end of a range (e.g., white) is adjacent another block of pixels having endpoint values at the opposite end of the range (e.g., black). For example, artifacts such as "ringing" or "mosquito noise" can become apparent near text characters and/or linear pattern content in an image that has been processed using a number of compression techniques.

A decompressed image can be post-processed using spatial filters to remove such artifacts. However, post-processing using spatial filters may introduce unnecessary computational complexity and may reduce image quality. An image object-type map can be used for post-processing to convert pixels that no longer exhibit an original data value (e.g., white) back to the original data value. However, such post-processing may introduce unnecessary computational complexity involving transmission of the image map and comparison of a decompressed image to the image object-type map.

BRIEF DESCRIPTION OF THE DRAWINGS

FIGS. 6A-D illustrate examples of various image processing actions according to a number of embodiments of the present disclosure.

DETAILED DESCRIPTION

Figure 1A:
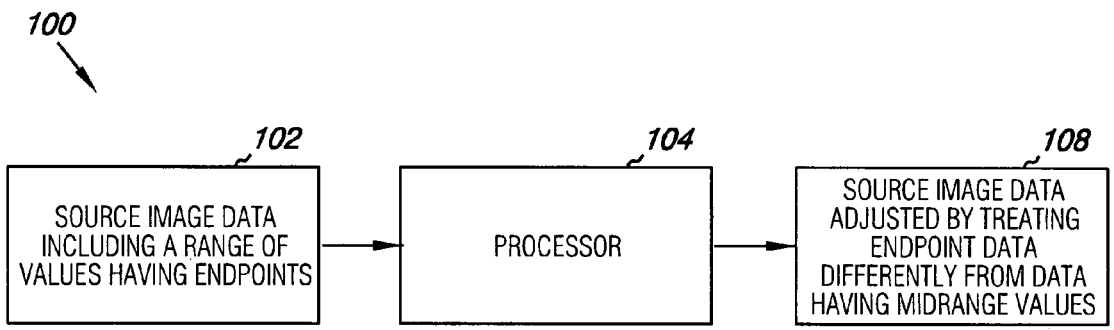
FIG. 1A illustrates an example of an image processing apparatus adjusting source image data according to embodiments of the present disclosure.

As will be appreciated by one of ordinary skill in the relevant art, an imaging system can have a processing device associated with an imaging apparatus to compress image data to reduce image file size to facilitate storing a number of image files and/or transmitting an image file. Two types of compression methods are "lossless" and "lossy". While lossless compression does not discard source image data from the original image, lossy compression can create smaller files by discarding some source image data from the original image. Using lossy compression can be intended to remove details and color changes deemed small enough to be indiscernible by the human eye. However, using a lossy compression method can, in some situations, result in reduced image quality after decompression in exchange for the reduction in file size.

The method of the Joint Photographic Experts Group (JPEG), and variations/equivalents thereof, is an example of a lossy compression algorithm that can substantially reduce file size compared to a file size including all the source image data. JPEG can operate by converting a spatial representation of an image into a frequency map of the image. A forward discrete cosine transform (FDCT) can separate high-frequency and low-frequency image data present in the image. Varying quantities of high-frequency image data then can be selectively discarded, depending on a predetermined compression size. The more the image file size is reduced, the more high-frequency data can be discarded, which can result in loss of image quality.

Compression algorithms such as JPEG can achieve acceptable results on a continuous tone image such as a photograph or natural artwork portraying a natural, real-world scene either in full color or grayscale. Compression algorithms such as JPEG, however, can introduce artifacts (i.e., noise) into solid-color areas, which can distort and/or blur flat-color graphics and, notably, sharp transitions from a color at one end of a range of values to another color at the other end of the range of values. After decompression, artifacts such as ringing or mosquito noise can become apparent in an image near text characters and/or linear pattern content due to widening of the range for endpoint values of a block of pixels having endpoint values at one end of the range (e.g., white) and/or widening of the range of another block of pixels having endpoint values at the opposite end of the range (e.g., black), in particular when such blocks of pixels are adjacent. In such instances, users may desire that such artifacts do not reduce the quality of the previously compressed image.

Accordingly, among various embodiments of the present disclosure, image processing can be performed by receiving source image data including a range of values having endpoints. The source image data can be treated by adjusting at least one subset of endpoint data differently from data having midrange values, where adjusting the source image data is performed prior to compressing the source image data. In some embodiments, the source image data can be compressed using a forward discrete cosine transform (FDCT) after adjusting the source image data.

FIG. 1A illustrates an example of an image processing apparatus adjusting source image data according to embodiments of the present disclosure. FIG. 1A illustrates an image processing apparatus 100. The image processing apparatus 100 can include receiving source image data including a range of values having endpoints 102, a processor 104 that can use executable instructions to adjust the source image data by treating endpoint data differently from data having midrange values 108.

The image processing apparatus 100 of FIG. 1A can have memory coupled thereto, where program instructions can be stored for execution by the processor 104. In various embodiments, the program instructions executable to treat endpoint data differently from data having midrange values can treat a range of values having numerical measurements of brightness (e.g., on a pure white to pure black scale), saturation, and/or chroma (and similar terms for such variables), among others. In some embodiments, a first subset of endpoint data can use a value of 0 for each data point therein, a second subset of endpoint data can use a value of 255 for each data point therein, and a subset of midrange values can use a value from 1-254 for each point therein.

In various embodiments, the program instructions executed to receive the source image data 102 can include instructions to execute receiving source image data associated with pixels in alphanumeric character text, graphic image, symbols, and mixed text, image, and/or symbol documents. In addition, embodiments can receive source image data from various sources. The embodiments can receive source image data from a number of apparatus types (e.g., a telecommunication apparatus, a telefaxing apparatus, a computing apparatus, a copying apparatus, and/or a scanning apparatus, among others) that can be connected to the image processing apparatus 100. For example, all of the just-mentioned functionalities can be included in an All-In-One (AIO) system having an associated (e.g., embedded) image processing apparatus 100 that can contribute to performing the functions described below.

Figure 1B:
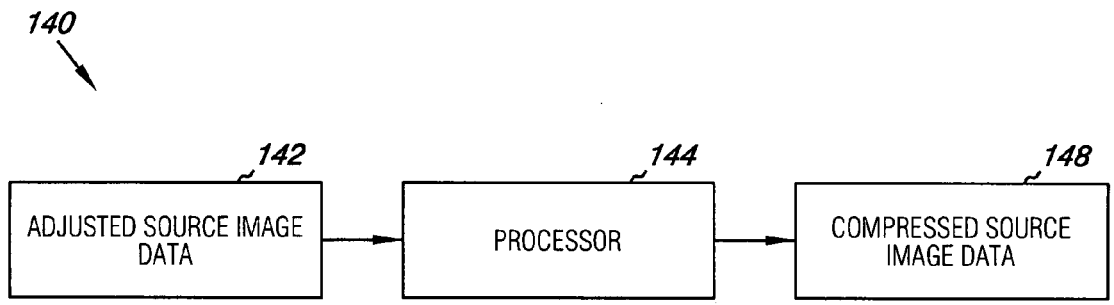
FIG. 1B illustrates an example of an image processing apparatus compressing adjusted source image data according to an embodiment of the present disclosure.

FIG. 1B illustrates an example of an image processing apparatus compressing adjusted source image data according to an embodiment of the present disclosure. FIG. 1B illustrates an image processing apparatus 140 that can process adjusted source image data 142, as shown in 108 of FIG. 1A. Embodiments of the present disclosure can use program instructions executable by a processor 144 to create compressed source image data 148 by using previously adjusted source image data 142. Pre-adjustment of source image data can be performed before compression of the source image data using either lossless or lossy compression algorithms (e.g., JPEG, Graphics Interchange Format (GIF), Portable Network Graphic (PNG), and variants thereof, among others).

Figure 2A:
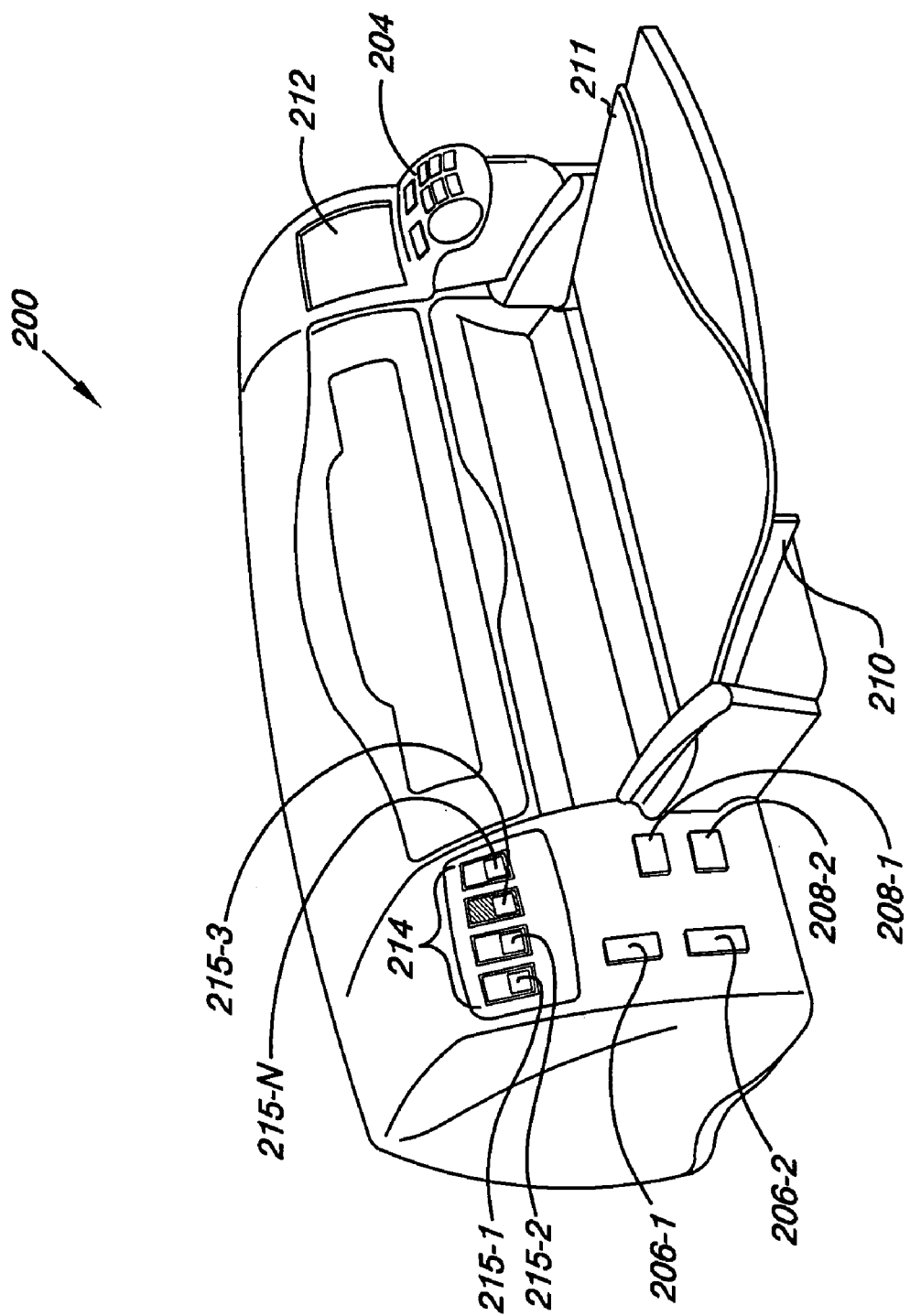
FIGS. 2A and 2B illustrate embodiments of apparatuses that are operable to implement or that can include embodiments of the present disclosure.
Figure 2B:
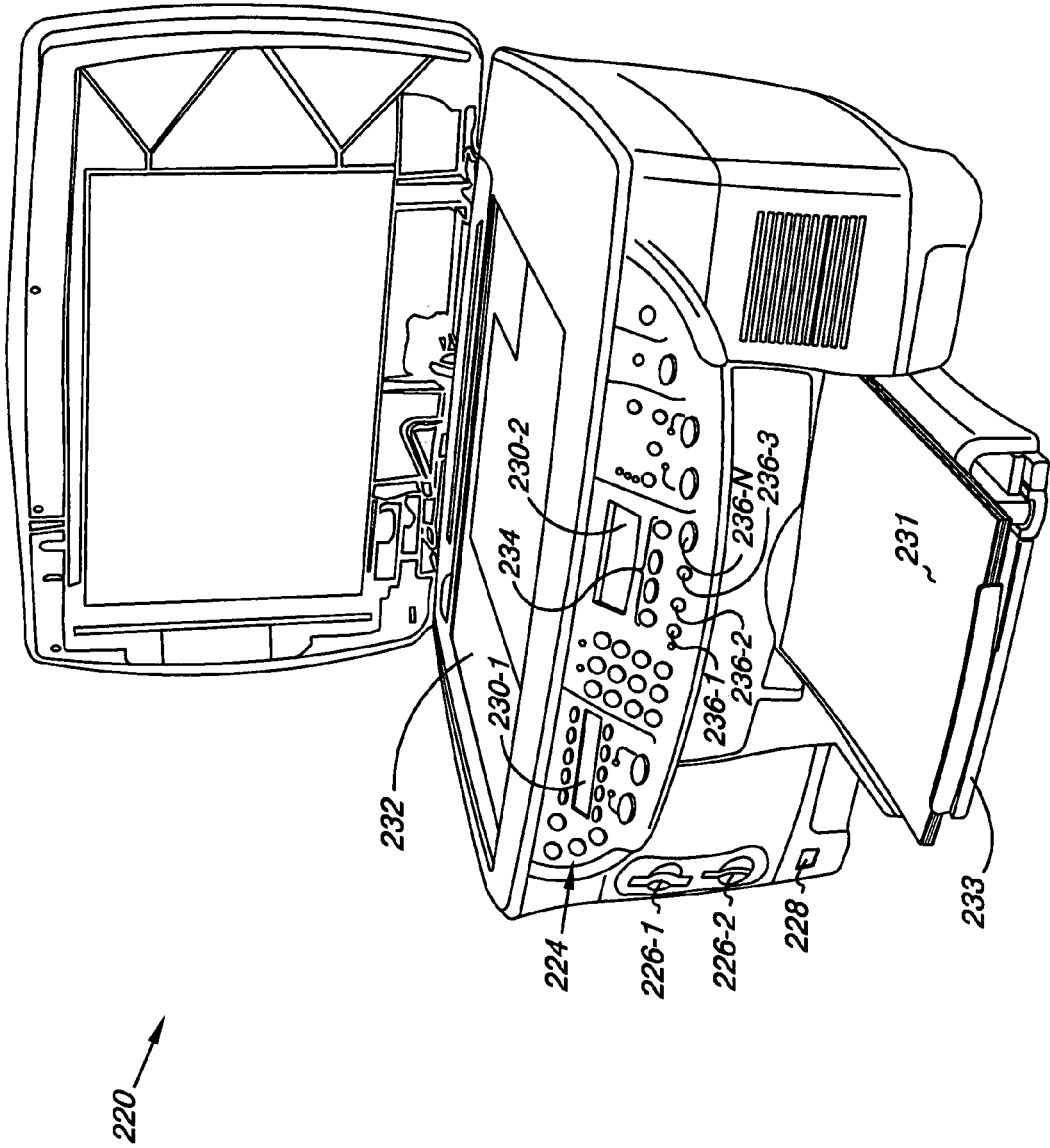

FIGS. 2A and 2B illustrate embodiments of apparatuses that are operable to implement or that can include embodiments of the present disclosure. As one of ordinary skill in the relevant art will appreciate, embodiments of the present disclosure are not limited to inclusion with or implementation on those apparatuses illustrated in FIGS. 2A and 2B.

FIG. 2A illustrates an embodiment of a printing apparatus 200. The printing apparatus 200 illustrated in the embodiment of FIG. 2A can operate as a stand alone apparatus and/or can be used as a printing apparatus in an imaging system. Printing apparatuses, such as printing apparatus 200, can be operable to receive image data including endpoint data values from one or more sources and can operate on such image data to transfer the data to print media. As shown in the embodiment of FIG. 2A, the printing apparatus 200 can include one or more data input mechanisms. As shown in the embodiment of FIG. 2A, the one or more data input mechanisms include one or more input keys 204, such as on a control panel, one or more media slots 206-1 and 206-2 operable to receive one or removable memory, such as a flash memory card, and one or more data ports 208-1 and 208-2 operable to receive additional data input. By way of example, and not by way of limitation, many printing apparatuses allow users to conveniently input a memory card from a digital camera.

As one of ordinary skill in the relevant art will appreciate, the one or more data ports 208-1 and 208-2 can include a data port operable to receive parallel or serial data connection. For example, the one or more data ports 208-1 and 208-2 can include a data port configured to receive a high speed serial cable connection, such as a USB cable. The one or more data ports 208-1 and 208-2 can further include a data port configured to receive data in a wireless fashion, such as by using an IR or Bluetooth wireless mechanism. The printing apparatus 200 embodiment of FIG. 2A thus can be operable to obtain data of any type, from any number of sources. Data in the various embodiments can include information such as user commands, image data, and computer readable instructions or instruction sets, among others.

As shown in the embodiment of FIG. 2A, some printing apparatuses can include a display screen 212, such as an LCD, to assist in reviewing images to be printed. As further shown in the embodiment of FIG. 2A, the printing apparatus 200 can include one or more print media handling devices 210, such as a bin or tray. Print media 211, such as paper, plastic, and cardstock, among others, can be accessed by the printing apparatus 200 by having the print media 211 provided on or in a media handling device, such as media handling device 210.

FIG. 2A also includes one or more print mode indicators 214 thereon for passively and/or actively indicating a print mode setting. In the embodiment shown in FIG. 2A, the printing apparatus 200 has several indicators 215-1, 215-2, 215-3, . . . 215-N operable to indicate the one or more print modes of a print job being initiated. FIG. 2A illustrates that one (i.e., indicator 215-3) of the indicators 215-1, . . . 215-N is illuminated, thereby indicating that a specific print mode has been selected. The one or more indicators 214 are also actuatable buttons operable to physically select one or more print modes.

The printing apparatus 200 can be configured to allow the print mode to be reviewed and confirmed before printing begins. In addition to indicating the print mode being used, the indicators 214 can indicate that a particular print mode is intended to be used and that the printing apparatus 200 is operable to receive either a confirmation of the use of that print mode, or a change to a different mode. The one or more indicators 215-1, . . . 215-N can be selected by a user based upon review of the artifacts in an intended print job on the display screen 212 to affect post-compression processing of an image (e.g., adjustment of decompressed image data, as described below). The one or more indicators 215-1, . . . 215-N can be automatically selected in connection with a sensor (not shown). In some embodiments, the sensor can interface with the indicators to reflect detection of a level of artifacts sensed by the sensor.

FIG. 2B illustrates an embodiment of a multi-function apparatus 220, such as an AIO apparatus, suitable for use with various embodiments of the present disclosure. The AIO apparatus 220, illustrated in the embodiment of FIG. 2B, can operate as a stand alone apparatus and can further be used as a printing apparatus in an imaging system, such as the printing apparatus 200 shown in FIG. 2A.

In the embodiment of FIG. 2B, the multi-function apparatus 220 is illustrated as having one or more data input mechanisms. In the embodiment shown in FIG. 2B, the one or more data input mechanisms can include one or more input keys 224, one or more memory media slots 226-1 and 226-2, and/or one or more data ports 228. As shown in the embodiment of FIG. 2B, the multi-function apparatus 220 can include one or more print media handling components 233 for holding one or more pieces of print media 231. And, as shown in the embodiment of FIG. 2B, the multi-function apparatus 220 can include a scanning/copying input 232, and one or more display screen user interfaces 230-1, 230-2.

The multi-function apparatus 220 embodiment of FIG. 2B thus can be operable to obtain data of any type, from any number of sources. As shown in the embodiment of FIG. 2B, the multi-function apparatus 220 can also include one or more imaging mode indicators 234 and one or more imaging selection buttons 236-1, 236-2, 236-3, . . . 236-N associated therewith. The imaging mode selectors 236-1, . . . 236-N are shown, by way of example and not by way of limitation, as buttons that can be pressed to change or indicate the imaging mode desired. The imaging modes that can, in various embodiments, be among the imaging modes selected are image file size to be achieved by image compression, kind and/or level of pre-adjustment of source image data prior to compression, and kind and/or level of post-adjustment of image data associated with decompression, among others related to embodiments of the present disclosure. Those skilled in the relevant art will appreciate that an indicator can be provided within a button, thereby providing a unified structure for both indicating and selecting the print mode.

Figure 2C:
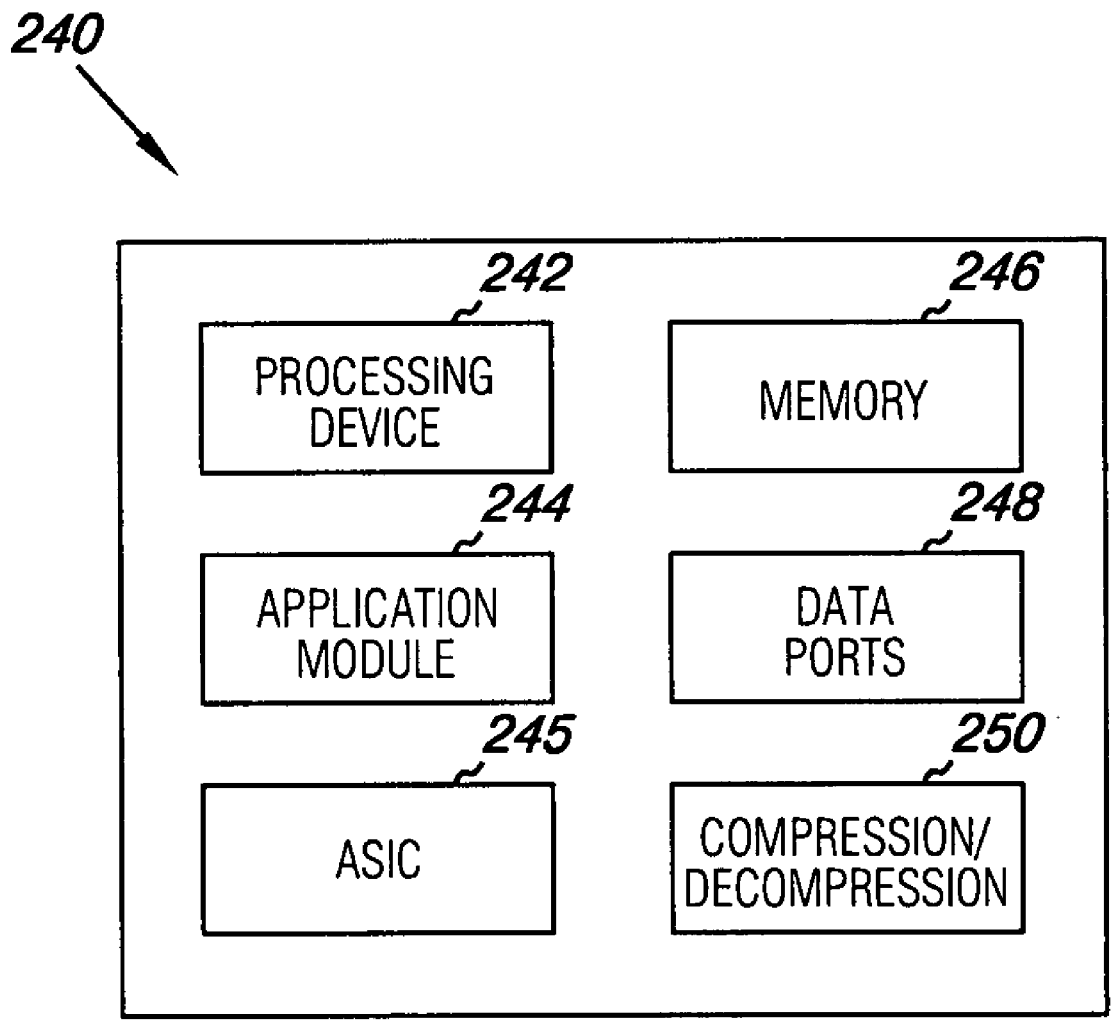
FIG. 2C illustrates a block diagram embodiment of one or more components includable in an apparatus, such as the apparatuses shown in FIGS. 2A and 2B.

FIG. 2C illustrates a block diagram embodiment of one or more components includable in an apparatus, such as the apparatuses shown in FIGS. 2A and 2B. The embodiment of FIG. 2C illustrates the apparatus 240 including one or more processing devices 242, one or more application modules 244, suitable for operating on software and computer executable instructions, and one or more application-specific integrated circuits (ASIC) 245 having logic operable on the systems, methods, apparatuses, and devices described herein, or otherwise, for eventuating the functionalities of the present disclosure. In the embodiment of FIG. 2C, the apparatus 240 is further illustrated as having one or more resident memory mediums 246 and one or more removable or portable memory mediums and/or data ports 248 as the same have been described herein. By way of example and not by way of limitation, the one or more portable memory mediums can include selectably insertable memory mediums, such as memory cards.

The embodiment shown in FIG. 2C also can include one or more memories storing executable instructions related to image processing. Among such memories can be one or more memories 250 having instructions for compression and/or decompression algorithms usable on image files. Instructions for compression/compression using algorithms such as JPEG, GIF, and/or PNG, among others, can be stored in the one or more memories 250. In addition, embodiments of the present disclosure can be stored in the one or more memories 250 with the compression/decompression algorithms (or elsewhere) to operate in combination with the JPEG, GIF, and/or PNG algorithms, among others, to reduce apparent artifactual noise in an image that could otherwise result from processing with the algorithms. In some embodiments, the compression/decompression can be performed by and/or in association with the ASIC 245 having appropriate logic for eventuating the compression/decompression.

In some embodiments, the sensor described in connection with the printing apparatus 200 of FIG. 2A can interface with the apparatus 240 shown in FIG. 2C to automatically adjustments of compression parameters based upon detection of a level of artifacts sensed by the sensor. In some embodiments, user input can be utilized for adjusting the compression parameter, which can be based upon detection of artifacts in a display screen interface, for example, as shown at 212 of FIG. 2 and 230-1 and 230-2 of FIG. 3, or otherwise. The apparatus 240 thus can determine whether to allow the image to be printed or to allow the image to be reviewed, confirmed, and/or changed by execution of programmable instructions and/or user input before it is printed.

As stated above, various embodiments of the present disclosure can be performed by software, application modules, computer executable instructions, and/or ASICs operable on the systems, apparatuses, and devices described above, or otherwise, for eventuating the functionalities of the present disclosure. As one of ordinary skill in the relevant art will appreciate upon reading and practicing the disclosure, software, application modules, computer executable instructions, and/or ASICs suitable for eventuating the functionalities of the present disclosure can be resident in a single apparatus (e.g., printing apparatus 200 and/or AIO apparatus 220) or the same can be resident in more than one apparatus across several and even many locations, such as in a distributed computing environment (e.g., an imaging system). The present disclosure is not limited either to any particular operating environment or to software written in a particular programming language.

Figure 3A:
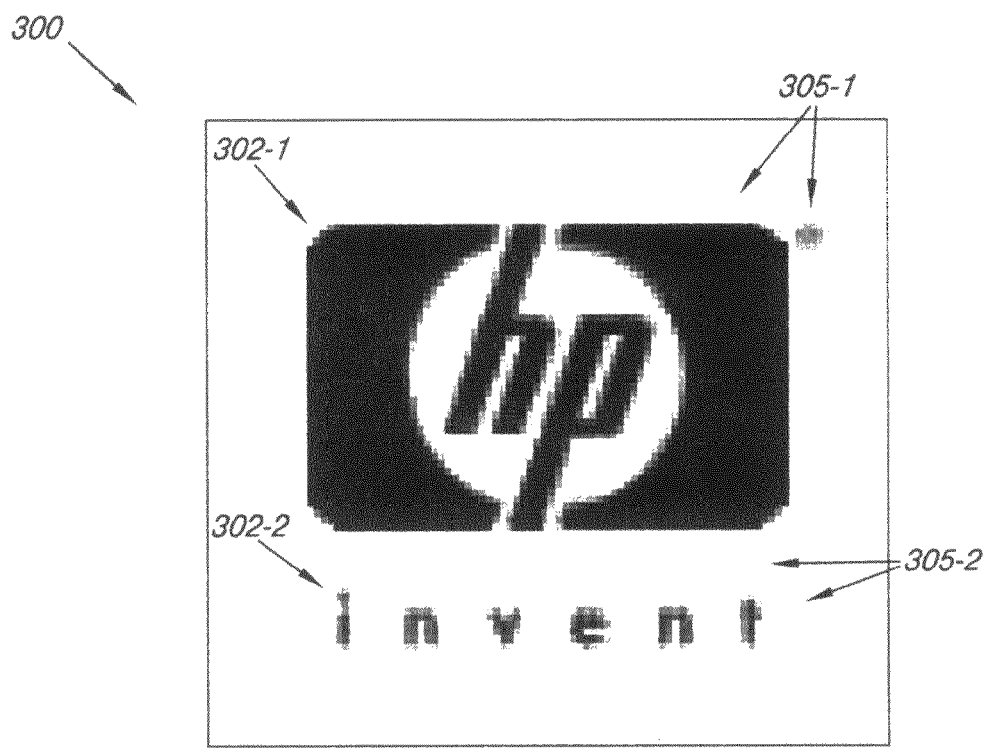
FIG. 3A illustrates an example of an image suitable for processing by embodiments of the present disclosure.

FIG. 3A illustrates an example of an image suitable for processing by embodiments of the present disclosure. FIG. 3A illustrates an example of an original image 300 before compression. The original image 300 is shown as having sharp and/or localized transitions from pixels using endpoint values, such as black, to pixels using endpoint values, such as white, at the other end of the range of values. As shown at 302-1 and 302-2, the transitions between a group of pixels having one endpoint value and another group of pixels having the other endpoint value are sharp and/or localized to a distinct region/boundary without having extraneous tinted pixels and/or groupings of pixels in the vicinity of region/boundary perimeters. For example, the edges of the thick black block and large black letters shown at 302-1 are distinct and the linear pattern of the thinner black letters shown at 302-2 does not have notably tinted pixels outside a region/boundary of such letters. In addition, the region/boundary having white endpoint pixel values surrounding the black block and the gray/black dot 305-1 and the region/boundary having white endpoint pixel values surrounding the text 305-2 do not have notably tinted pixels outside a region/boundary of such image elements.

Figure 3B:
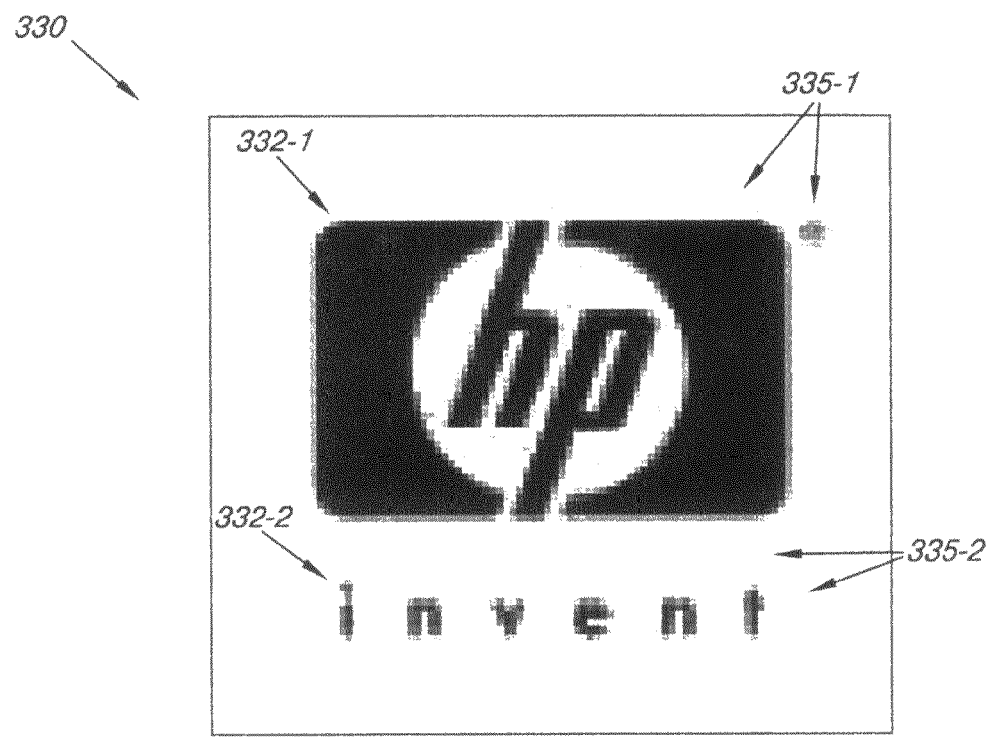
FIG. 3B illustrates an example of an image processed using a compression technique without utilizing embodiments of the present disclosure.

FIG. 3B illustrates an example of an image processed using a compression technique without utilizing embodiments of the present disclosure. The image 330 illustrated in FIG. 3B shows an example of compression (e.g., using JPEG) on an image originally having sharp transitions from pixels using endpoint values, such as black, to pixels using endpoint values, such as white, at the other end of the range of values, such as illustrated in FIG. 3A. For purposes of illustration, the effect of compression on pixels near the perimeter of regions/boundaries is magnified in FIG. 3B. As shown at 332-1 and 332-2, the transitions between a group of pixels having one endpoint value and another group of pixels having the other endpoint value are no longer sharp. For example, the edges of the thick black block and large black letters shown at 332-1 are indistinct, or "fuzzy", and the linear pattern of the thinner black letters shown at 332-2 is more indistinct, making the word "blurry". In addition, ringing and mosquito noise artifacts are apparent in the region/boundary having white endpoint pixel values surrounding the black block and gray/black dot 335-1 and the region/boundary having white endpoint pixel values surrounding the text 335-2, which can represent an effect that can also become apparent in images using lines for tone patterns.

Figure 4A:
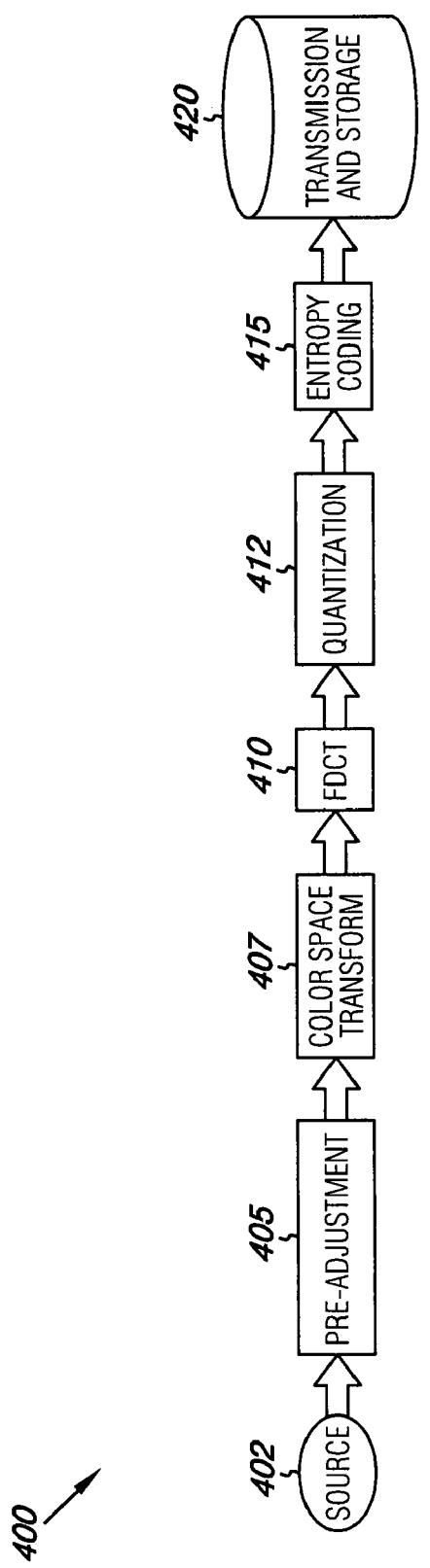
FIG. 4A is a block diagram illustrating an image processing compression technique according to an embodiment of the present disclosure.

FIG. 4A is a block diagram illustrating an image processing compression technique according to an embodiment of the present disclosure. The compression technique 400 illustrated in FIG. 4A exemplifies, for the most part, compression techniques appreciated by one of ordinary skill in the art of image processing. Hence, underlying principles of compression techniques are described in the present disclosure in a cursory fashion with the understanding that the reader is familiar with compression techniques in general. The compression technique 400 in the present disclosure is distinguishable from previous compression techniques by virtue of receiving source image data 402 and performing a pre-adjustment 405 on the source image data 402 before the adjusted image data undergoes processing leading to compression and storage in an image file.

As illustrated in the compression technique 400 shown in FIG. 4A, in some embodiments, a color space transform 407 can be performed on the image data after pre-adjustment 405 of the source image data 402. In the embodiment shown in compression technique 400, the color space transform 407 transforms the pre-adjusted image data into a color space model determined to be suitable for subsequent processing (e.g., compression). Such color space transformation can be optional, however, because the following portions of a compression algorithm (e.g., JPEG) can handle each color component independently, regardless of the color components. In addition, images originally in grayscale can be processed without a color space transform.

Color images, however, using a first color space model can be transformed from the first color space model into a second color space model. Some embodiments transform the color data associated with the first color space model to the color data in the second color space model by using gamut mapping in a device-independent color exchange space such as CIELAB, CIELUV, CIEXYZ, CIECAM97s, or CIECAM02.

In some embodiments, the color data associated with the first color space model and received by a processing device performing the color space transform 407 can be associated with one of a number of color space models using red, green, and/or blue as the primary colors (e.g., a variation of an RGB color space) and the color data transformed to the second color space model 108 can be transformed into a luminance/chrominance color space model (e.g., variations of YCbCr, YUV, and YIQ color space models, among others). Such second color space models can utilize components representing luminance, or brightness (e.g., the Y components of YCbCr, YUV, and YIQ) in a black-and-white (e.g., grayscale) image presentation combined with two color channels (e.g., the Cb and Cr components, the U and V components, and the I and Q components) that can represent chrominance in the color channel.

The two color channels can be conceptualized as X and Y axes that intersect at a mutual neutral gray chroma value. Various color space models (e.g., the YCbCr, YUV, and YIQ color space models) can have brightness components in common (e.g., Y) and differ in the color channels utilized. Representatives of such color space models can be interconverted by rotation around the intersection of the two-dimensional X and Y axes.

The luminance component of the luminance/chrominance color space model can be considered as grayscale brightness and the chrominance can include the two axes of color information. A rationale for transforming to a luminance/chrominance color space model can be that the human eye is more sensitive to changes in high-frequency luminance than to changes in high-frequency chrominance information. As such, it can be more acceptable to lose information in the chrominance components than in the luminance component. Color space transform 407 can be lossy due to roundoff errors, however, the amount of error can be substantially smaller than errors leading to artifacts resulting from compression, as described below.

In various embodiments, the received color data associated with the first color space model can include color data associated with pixels in text, graphic image, and mixed text and graphic image documents. Images having monochrome text, linear tone patterns, and/or multicolored image(s) can be susceptible to artifacts associated with text characters and/or linear patterns having sharp transitions between endpoint data values, as shown in FIG. 3, and embodiments of the present disclosure can assist in reducing perceptible changes associated with text characters and/or linear patterns relative to the original image, as described below.

As illustrated in the compression technique 400 shown in FIG. 4A, a forward discrete cosine transform 410 (FDCT) is performed to initiate compression of the pre-adjusted image data. As described above, the FDCT 410 can be performed, in some embodiments, without a preceding color space transform. Data values for image pixels in each color space component can be grouped into eight-by-eight (8×8) blocks prior to FDCT 410. The values in each 8×8 block can then be transformed by FDCT 410, which is related to the Fourier transform, to yield a frequency map with 8×8 values in tiles for each component block. Each block thus can have numbers representing an average value in each tile and successively higher frequency changes within each component block. High-frequency information thus can be discarded in compression without affecting low-frequency information. Roundoff errors can be associated with such quantization. A FDCT can be reversible except for such roundoff errors, which can contribute to artifacts becoming apparent in a processed image.

As illustrated in the compression technique 400, quantization 412 of image data can be performed after FDCT 410. In quantization 412, each of the 64 frequency components in individual tiles of each block can be divided by quantization coefficient, which can be different for each of the frequency components, followed by rounding the resulting numerical values to integers. An 8×8 table containing individualized quantization coefficients for each of the 64 frequency components can be termed a quantization table, or "Q-table". This process can result in noticeable loss of information. That is, the larger the quantization coefficient, the more data is discarded. Even the minimum quantization coefficient of 1 can result in some loss of information because the FDCT outputs may not be integers. Higher frequencies can be quantized less accurately than lower frequencies due to higher quantization coefficients being used for higher frequencies.

Embodiments can (e.g., using one or more ASIC having appropriate logic) receive source image data and adjust a quantization table associated with compression of source image data to adjust compressed image quality and file size. Adjusting the quantization table can be performed to handle a data value in a range adjacent at least one subset of endpoint data values differently from a data value in a midrange of data values, as described below.

After quantization 412, the compression technique 400 illustrated in FIG. 4A can perform entropy encoding 415. Entropy encoding 415 can statistically identify redundant image data after quantization 412 to enable reducing such redundancy and, in some embodiments, allow completing compression of an image file.

Consequently, image compression algorithms (e.g., variations of JPEG) can reduce a quantity of data being saved in an image file in order to reduce image file size. Compression accomplished using such an algorithm, however, can also reduce image quality as a trade-off for extent of compression. That is, the more an image file size is reduced, the more image quality can be reduced. Embodiments of the present disclosure can counteract introduction of artifacts to an image by compression, in particular ringing and mosquito noise associated with sharp transition at boundaries of pixel groupings having endpoint data values. In some embodiments, the degree of artifact reduction can be selectable by user input. In some embodiments, the degree of artifact reduction can be substantially independent of the extent to which an image file can be compressed.

A compressed image file is suitable for transmission and/or storage 420. The compressed image file can be transmitted using any suitable mechanism for transmission. Transmission can be used to enable downstream processing of an image by an imaging system, which can, in some embodiments, be executed in the same imaging apparatus that executed compression of the image file. Storage of a compressed image file can be executed by memory in the imaging system, which can, in some embodiments, be executed in the same imaging apparatus that executed compression of the image data, or elsewhere.

Figure 4B:
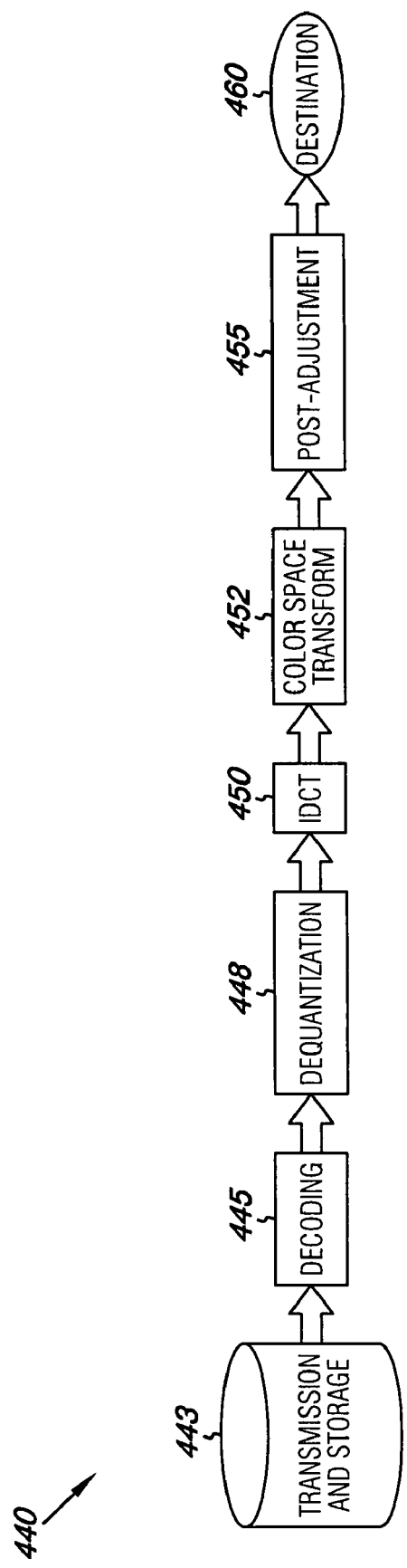
FIG. 4B is a block diagram illustrating an image processing decompression technique according to an embodiment of the present disclosure.

FIG. 4B is a block diagram illustrating an image processing decompression technique according to an embodiment of the present disclosure. A portion of decompression technique 440 illustrated in FIG. 4B exemplifies, as with a portion of the compression technique 400 of FIG. 4A, represents techniques already appreciated by one of ordinary skill in the art of image processing. The decompression technique 440 embodiments of the present disclosure can be distinguished from previous decompression techniques, however, by receiving image data and performing post-adjustment 455 on the image data before the adjusted image data undergoes processing at a destination 460.

In various embodiments, processing at the destination 460 can include one or more of the sequence of actions illustrated in decompression technique 440. By way of example and not by way of limitation, any of the executable actions illustrated in decompression technique 440 can be executed by one or more processors in the printing apparatus 200 of FIG. 2A and/or the AIO apparatus 220 of FIG. 2B. Moreover, post-adjustment of image data can be executed at various points in a decompression technique and is not limited by the sequence illustrated in the decompression technique 440 illustrated in FIG. 4B.

The decompression technique 440 illustrated in FIG. 4B executes an algorithm that, in some part, reverses a preceding compression algorithm, for example, the algorithm utilized in executing the compression technique 400 of FIG. 4A. As such, compressed image data are retrieved from transmission and/or storage 443, for decoding 445 the image data. Decoded image data can undergo dequantization 448 by multiplying the reduced data values by the individualized quantization coefficients previously used in dividing the 64 frequency components in individual tiles of each block. Following dequantization 448, an inverse discrete cosine transform 450 (IDCT) can be performed to convert a frequency map with 8×8 values in tiles for each component block to data values for image pixels in each color space component (e.g., the components of the YCbCr, YUV, and YIQ color space models).

Some embodiments can (e.g., using one or more ASIC having appropriate logic) adjust a dequantization table associated with decompression to assign a data value in the range adjacent at least one subset of endpoint data values to at least one subset of endpoint data values. Some embodiments provide for decompression using an IDCT.

As illustrated in the embodiment of decompression technique 440 in FIG. 4B, a color space transform 452 can be performed between the IDCT 450 and the post-adjustment 455. In some embodiments, as described above, no color space transform was executed during compression. In some situations, for various reasons, a user and/or software can determine whether to execute a color space transform of decompressed image data. Hence, a color space transform 452 is optionally associated with decompression. Executing post-adjustment 455 of image data, according to embodiments, prior to processing (e.g., printing) at the destination 460 is described in further detail below.

Figure 5A:
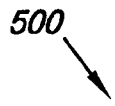
FIGS. 5A-B illustrate examples of various quantization and dequantization tables according to a number of embodiments of the present disclosure.
Figure 5B:

FIGS. 5A-B illustrate examples of various quantization and dequantization tables according to a number of embodiments of the present disclosure. The quantization table 500 illustrated in FIG. 5A and the dequantization table 530 illustrated in FIG. 5B are shown by way of example and not by way of limitation. That is, as will be apparent to one of ordinary skill in the relevant art, many versions of such tables can be utilized depending upon desired levels of optimizing precision and dealing with rounding errors, among other factors.

The post-adjustment of image data can be described mathematically as $f(x, y) = f'(x, y) \times C$, where $f'$ is the decompression result when the post-adjustment is not applied and $C$ is a constant $>1$ representing the magnitude of the post-adjustment. In addition, the post-adjustment can include numeric range clamping such that values that would otherwise fall outside a normal range are limited so as to remain within the normal range.

Being the result of decompression, $f'$ can be related to the IDCT mathematically as $f'(x, y) = IDCT(x, y, u, v)$, where the IDCT can be defined as: $f'(x, y) = \Sigma^{7}_{u=0} \Sigma^{7}_{v=0} B(u, v, x, y) \times F'(u, v) \times Q'(u, v)$. Within this formula, $B(u, v, x, y)$ can be defined as a set of JPEG basis tiles (e.g., cosine waves at various frequencies), $F'$ can be defined as a set of quantized frequency values from a quantization table, and $Q'$ can be defined as a set of values from a dequantization table.

As indicated above, $f(x, y) = f'(x, y) \times C$. Substituting the previously indicated value of $f'$, $f(x, y) = IDCT(x, y, u, v) \times C$. Substituting the formula for the IDCT, $f(x, y) = (\Sigma^{7}_{u=0} \Sigma^{7}_{v=0} B(u, v, x, y) \times F'(u, v) \times Q'(u, v)) \times C$. Simplifying by algebraic properties can yield $f(x, y) = \Sigma^{7}_{u=0} \Sigma^{7}_{v=0} B(u, v, x, y) \times F'(u, v) \times (Q'(u, v) \times C)$. Notably, the just-recited formula is the same as the original IDCT formula except that $Q'(u, v)$ has been replaced with $Q'(u, v) \times C$. Hence, the post-adjustment can be accomplished by scaling a dequantization table by the constant factor $C$ relative to a quantization table.

Quantization performed during compression and dequantization performed during decompression, for instance, can be applied using the same set of values. However, consistent with the present disclosure, dequantization values can differ from the quantization values in being multiplied by a constant value such that $Q(u, v) = Q'(u, v) \times C$. In some embodiments, decompression can include a numeric range-clamping operation that is performed after the IDCT. The dequantization adjustment formula just-recited can indicate that each value of a dequantization table is multiplied by a constant factor relative to a corresponding value in a quantization table.

For example, the quantization table 500 illustrated in FIG. 5A can yield the dequantization table 530 illustrated in FIG. 5B by selecting a C factor of 1.125. As such, each value of quantization table 500 can produce a value at a corresponding position in dequantization table 530 by multiplying each value in the quantization table 500 by 1.125. In some embodiments of compression and decompression, particular file formats can use integers for quantization and dequantization values, which can result in numeric rounding when creating a dequantization table.

For example, as shown at several points in the upper left corners of the tables, multiplying a value of 6 in the quantization table 500 by 1.125 yields a value of 6.75, however, rounding the result to an integer supplies a value of 7 in the dequantization table 530. As indicated above, roundoff errors can be associated with quantization can contribute to artifacts becoming apparent in a processed image.

The precision of applying post-adjustment using dequantization tables can be limited by the actual quantization and dequantization values that are used. Among various possibilities for compensating, a customized compression-side algorithm can allow the use of decimal values in the quantization table to yield a value that is quite close to an integer for use in the dequantization table. For example, using a value of 5.3 in the quantization table can yield a value of 5.9625 when multiplied by 1.125, which can result in a small roundoff error when the integer 6 appears in the dequantization table. Another approach can be using only values in the quantization table that yield resultant integer values for use in the dequantization table when multiplied by a selected C factor. For example, using a C factor of 1.25 can cause values such as 4, 8, 12, and 20 in the quantization table to yield values such as 5, 10, 15, and 25, respectively, in the dequantization table. In general, optimizing the rounding precision of the lower-frequency dequantization values can have a larger impact on visibility of compression artifacts.

Figure 6C:
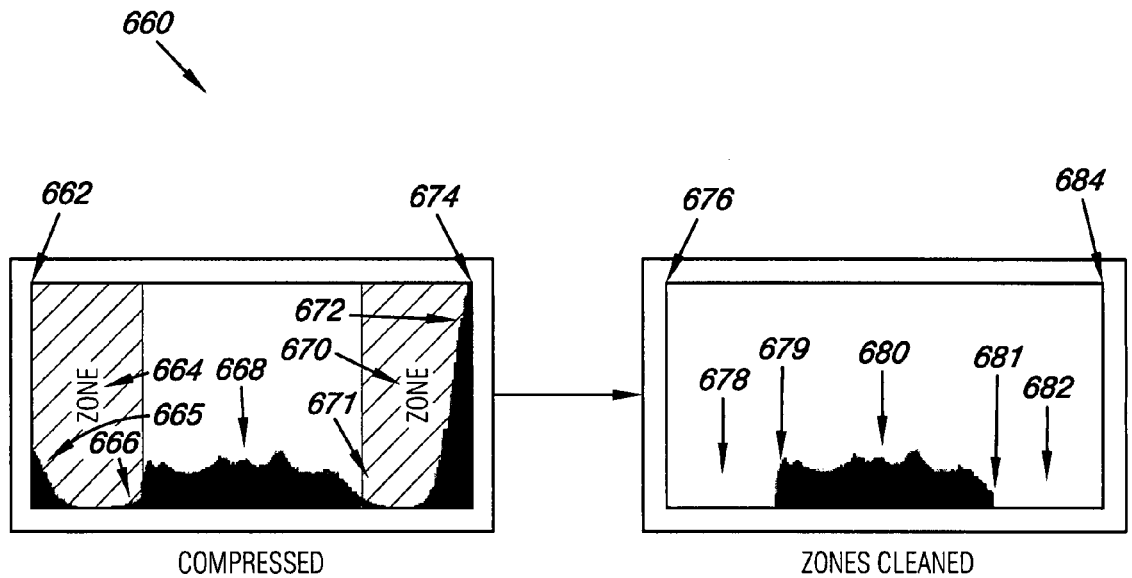

FIGS. 6A-D illustrate examples of various image processing actions according to a number of embodiments of the present disclosure. FIG. 6A illustrates an example of pre-adjustment 600 of original image data coming from a source prior to compressing the source image data in accord with an embodiment of the present disclosure. As described above, embodiments can receive image data from various sources including a number of apparatus types (e.g., a telecommunication apparatus, a telefaxing apparatus, a computing apparatus, a copying apparatus, and/or a scanning apparatus, among others).

By way of illustration and not by way of limitation, FIG. 6A shows pre-adjustment 600 to begin with a histogram of the original image data. The histogram of the original image shows a continuous range of data values. In some embodiments, the horizontal axis can show a range that can be a range of brightness (i.e., luminance) in an image from substantially pure white to substantially pure black. In such an embodiment, the vertical axis can show a relative number, or frequency, of data points (e.g., pixels) at each level of brightness. In the histogram of the original image shown in FIG. 6A, the left edge of the histogram can represent an endpoint of the continuous range of data values (e.g., black) and the right edge of the histogram can represent the other endpoint of the continuous range of data values (e.g., white).

The histogram of the original image illustrated in FIG. 6A shows a high-frequency peak of values 602 at the left endpoint of the range (e.g., black) that reaches a high recordable level on the vertical scale. A substantially lower frequency of brightnesses is shown throughout a midrange 605 of the histogram, which can represent various shades of gray, or luminance. Another high-frequency peak of values 608 is shown at the right edge of the range (e.g., white) that reaches a high recordable level on the vertical scale. In some instances, such a histogram can represent a luminance component of an image having, for example, text embedded in a graphic image. The high-frequency black endpoint values 602 and high-frequency white endpoint values 608 can represent black text characters printed on a white background in a portion of the image and the lower-frequency values spread across the midrange 605 can represent pixels of a graphic image.

As illustrated in FIG. 6A, the data values shown in the histogram of the original image can be modified by pre-adjustment. By way of example and not by way of limitation, a pre-adjustment look-up table (LUT) can be utilized in connection with the pre-adjustment. The pre-adjustment LUT shown in FIG. 6A is a simplified representation of a possible pre-adjustment LUT and is not intended as a limitation. The pre-adjustment LUT can represent modification of data values in the histogram of the original image on the left, such data values being applied to the horizontal axis of the LUT, to execute conversion to another set of data values, such data values appearing on the vertical axis of the LUT, shown in the histogram to the right of the pre-adjustment LUT.

For example, in some embodiments, data values near the high-frequency peak of values 602 at the left endpoint of the range (e.g., black) in the histogram of the original data values, but not including such peak values, can be shifted toward the center, or midrange 613, as represented by 610 in the pre-adjustment LUT. In some embodiments, data values near the high-frequency peak of values 608 at the right endpoint of the range (e.g., white) in the histogram of the original data values, but not including such peak values, can be shifted toward the center, or midrange 613, as represented by 615 in the pre-adjustment LUT.

In various embodiments, a histogram having reduced contrast, by way of example and not by way of limitation, can be produced. As illustrated in the contrast reduced histogram of FIG. 6A, the original endpoint values on the left edge of the range (e.g., black) can be left unmodified and remaining place at 620, whereas those data points that were immediately to the right have been shifted to clear a region, or zone 622, between high-frequency endpoint values 620 and midrange values 625. In some embodiments, a zone 627 can be cleared of data values between the midrange values 625 and the high-frequency endpoint values on the right edge 629. Similar to those of the left endpoint values 620, the original endpoint values on the right edge of the range (e.g., white) can be left unmodified and remain in place at 629. The data values formerly in zone 622 and zone 627 have not been discarded but, in accordance with how the midrange 613 of the pre-adjustment LUT has been shifted to a more horizontal angle, the values in the midrange have been compacted. Hence, substantially the entirety of the midrange 605 of the histogram of the original can be thought of as being compacted to yield the midrange 625 of the histogram with contrast reduced. That is, the midrange 625 covers a narrower range than that of the midrange 605 of the histogram of the original.

FIG. 6B illustrates an example of compression 630 of reduced contrast data in accord with an embodiment of the present disclosure. By way of illustration and not by way of limitation, FIG. 6B shows compression 600 to begin with a histogram of the reduced contrast data. The compression algorithm being executed as illustrated in FIG. 6B can begin with a contrast reduced histogram, as shown in FIG. 6A. The contrast reduced histogram illustrated in FIG. 6B similarly shows a high-frequency endpoint peak 632 at the left edge of the range, a zone 634 cleared of data values adjacent the endpoint peak 632, a midrange 636 of contrast reduced values, and a zone 638 cleared of data values adjacent another high-frequency endpoint peak 640.

Following use of a compression algorithm, as previously described, an average tone for the left endpoint peak of the compressed histogram has shifted as a result of broadening the range of the peak with a shoulder 644. When the data values that were originally in the peak 642 were black, shifting a number of those data values to the shoulder 644 can indicate that a number of black data values were converted by error to various, shades of dark gray. A noticeable shift in the average tone of the endpoint peak 642 can indicate a significant number of artifacts being introduced by compression.

A broadening of the margins 646, 650 of the compressed midrange values 648 is also shown. However, the broadening is substantially less than that of the broadening due to the average tone shift of endpoint data values. For example, execution of the compression algorithm can result in a substantial shoulder 652 appearing to the left of the endpoint values 654 on the right edge of the compression histogram. When the data values that were originally in the peak 654 were white, shifting a number of those data values to the shoulder 652 can indicate that a number of white data values were converted by error to various shades of light gray. A noticeable shift in the average tone of the endpoint peak 654 can indicate a significant number of artifacts being introduced by compression. An example of artifacts around transitions from white to black that can result from compression is illustrated in the image 330 illustrated in FIG. 3B.

FIG. 6C illustrates an example of cleaning 660 artifactual data values resulting from compression in accord with an embodiment of the present disclosure. By way of illustration and not by way of limitation, FIG. 6C shows cleaning 660 to begin with a histogram of the compressed image data. The cleaning as illustrated in FIG. 6C can (e.g., using an ASIC having appropriate logic) be executed by an algorithm (e.g., a point-process algorithm) that begins with a compressed histogram, as shown in FIG. 6B. The compressed histogram illustrated in FIG. 6C similarly shows a high-frequency endpoint peak 662 at the left edge of the range, a zone 664 containing black data values converted by error to various shades of dark gray 665, 666 adjacent the endpoint peak 662 and the midrange values 668, a midrange 668 of compressed contrast reduced values, and a zone 670 containing white data values converted by error to various shades of light gray 671, 672 adjacent the midrange values 668 and the endpoint peak 662.

Embodiments can clean defined zones containing endpoint data values converted by error to various shades of gray. As illustrated in FIG. 6C, a point-process algorithm, for example, can clean data values defined as erroneous, or artifactual, by being present after compression in a zone previously cleared of all data values. For instance, the zones cleaned histogram illustrated in FIG. 6C shows the left endpoint 676 to have adjacent data values converted by error to the adjacent zone 678 as being removed from the zone 678.

A point-process algorithm can (e.g., performed with an ASIC having appropriate logic) be used to execute a point-by-point reassignment of data values in a zone to a particular location. In FIG. 6C, the data values removed from zone 678 all can be reassigned to endpoint peak 676. In some embodiments, the data values removed from zone 678 can be reassigned to the nearest portion of the histogram (i.e., endpoint peak 676 or midrange 680). Data values removed from zone 678 and reassigned to the midrange 680 can be reassigned to an endpoint 679 of midrange 680 or can be spread within the midrange 680 (e.g., in a defined range bounded by endpoint 679 and extending a particular number of data values into midrange 680). Similarly, the data values in zone 682 all can be reassigned to endpoint 684 or the data values can be reassigned to the nearest portion of the histogram (i.e., to endpoint 684 or to a vicinity of an endpoint 681 of midrange 680). Hence, using pre-adjustment of source data values that enables creation of defined zones, erroneous data values resulting from compression can be identified cleaned from the defined zones.

Figure 6D:
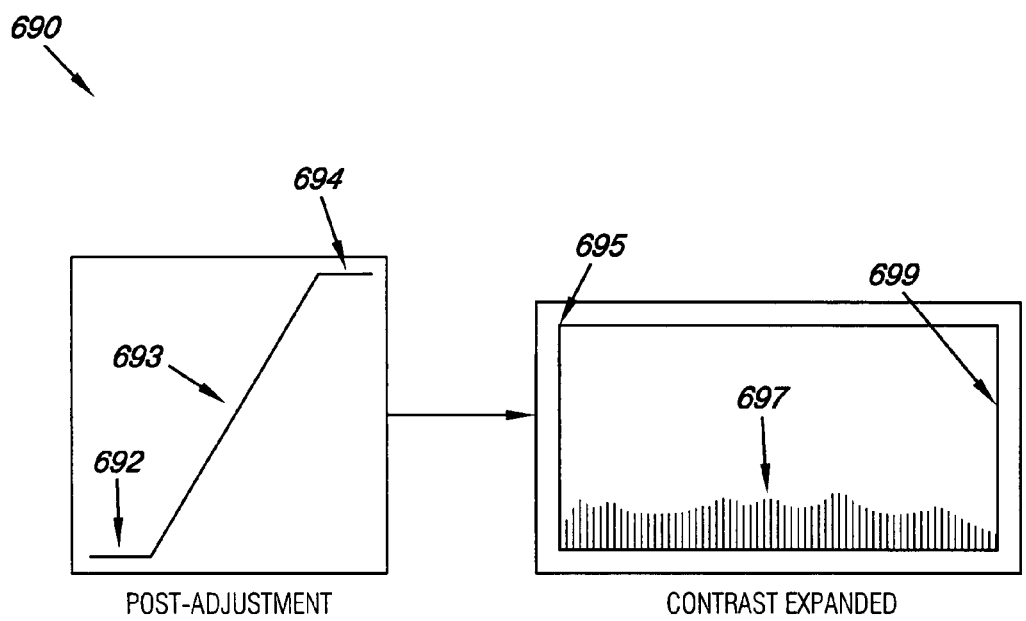

FIG. 6D illustrates an example of post-adjustment 690 of image data with cleaned zones in accord with an embodiment of the present disclosure. By way of illustration and not by way of limitation, FIG. 6D shows post-adjustment 690 can utilize a post-adjustment LUT. In some embodiments, post-adjustment can be performed without utilizing a LUT. The post-adjustment LUT shown in FIG. 6D can be an inverse of the pre-adjustment LUT illustrated in FIG. 6A. In any case, the post-adjustment LUT shown in FIG. 6D is a simplified representation of a possible post-adjustment LUT and is not intended as a limitation. The post-adjustment LUT can represent modification of data values in the histogram of the cleaned zones histogram of FIG. 6C, such data values being applied to the horizontal axis of the LUT, to execute conversion to another set of data values, such data values appearing on the vertical axis of the LUT, the result being illustrated in a contrast expanded histogram shown to the right of the post-adjustment LUT.

FIG. 6C illustrates the zones 678, 682 being cleaned of erroneous data for purposes of illustrating execution of a point-process algorithm for post-adjustment. One of ordinary skill in the relevant art will appreciate that the post-adjustment LUT illustrated in FIG. 6D can be used to execute cleaning of the zones illustrated in FIG. 6C. As such, the zones cleaned histogram of FIG. 6C and the post-adjustment LUT of FIG. 6D are shown by way of example and not by way of limitation. That is, cleaning the zones as illustrated in FIG. 6C and expanding the contrast using a post-adjustment LUT as illustrated in FIG. 6D can be executed in a single operation and/or a post-adjustment LUT.

In some embodiments, a zone cleaned 678 of erroneous data values near the high-frequency peak of values 676 at the left endpoint of the range in the zones cleaned histogram of the FIG. 6C can have data values restored to, at least in part, resupply the cleaned zone with data values. As illustrated in FIG. 6D, a high-frequency endpoint peak 695 on the left edge of the contrast expanded histogram, can be substantially restored to an original average tone, as illustrated in the histogram of the original image data shown in FIG. 6A, by execution of the point-process algorithm described with regard to FIG. 6C. In some embodiments, using a post-adjustment LUT as illustrated in FIG. 6D, can provide expansion of a previously contrast reduced histogram, as shown at midrange 680 of FIG. 6C, to create a contrast expanded histogram.

As illustrated in the contrast expanded histogram shown in FIG. 6D, expansion of a midrange 697 can resupply data points to a previously cleaned zone adjacent the endpoint data peak 695 on the left edge of the contrast expanded histogram. Expansion of the midrange 697 also can resupply data values to a zone cleaned of erroneous data values adjacent a high-frequency endpoint peak 699 of data values on the right edge of the contrast expanded histogram in some embodiments in which adjacent data values have been cleaned, as illustrated in the zone 682 of FIG. 6C. As illustrated in the contrast expanded histogram of FIG. 6D, the shape of the expanded midrange 697 can resemble the shape of the midrange 605 of the histogram of the original image data shown in FIG. 6A.

Consequently, embodiments as shown with regard to FIGS. 6A-6D can reduce artifacts associated with transitions from groups of pixels having endpoint data values at both ends of a range of endpoint data values. For example, ringing and mosquito noise can be reduced at the edges and surrounding text content and/or linear pattern content in images having such content. As such, embodiments can adjust quality of text content and/or linear pattern content in images having such content. As described with regard to FIG. 6D, embodiments leave substantially unadjusted the quality of graphic image content, which can be largely represented by data values in the midrange 697 illustrated in FIG. 6D.

Figure 7A:
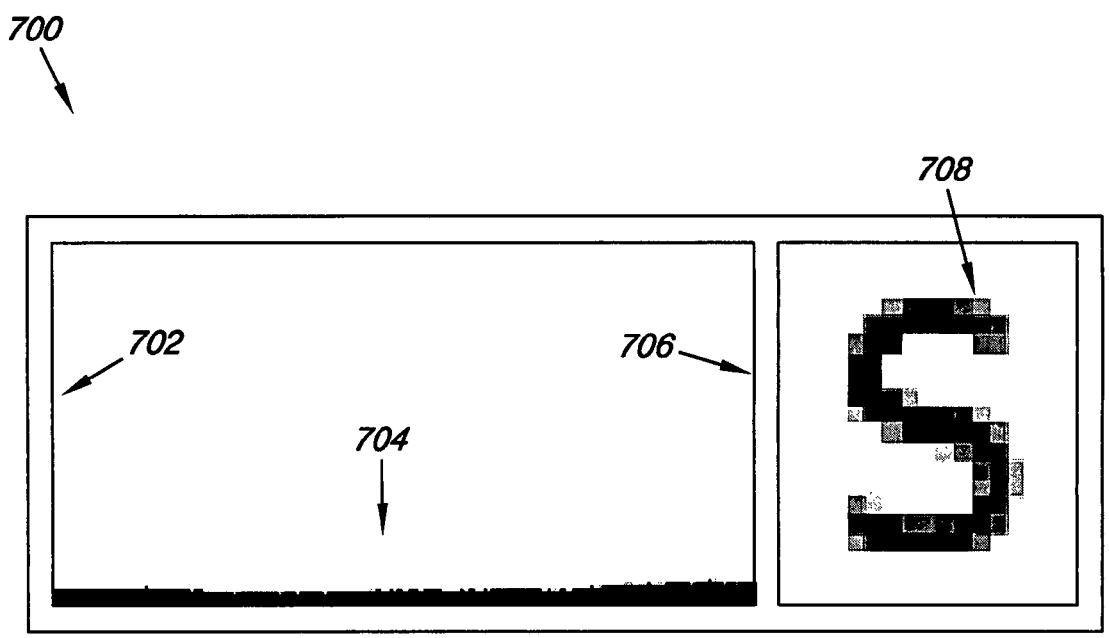
FIGS. 7A-D illustrate examples of results of various image processing techniques including a number of embodiments of the present disclosure.

FIGS. 7A-D illustrate examples of results of various image processing techniques including a number of embodiments of the present disclosure. FIG. 7A illustrates an example of original image data 700 coming from a source prior to compressing the source image data in accord with embodiments of the present disclosure. The original image data 700 illustrated in FIG. 7A show a histogram including endpoint values 702 at one end of a range of data values, a midrange 704 of data values, and endpoint data values 706 at the other end of the range of data values.

FIG. 7A also illustrates a text character 708. The histogram can represent the range of data values in the text character 708 (i.e., the letter S) shown to the right of the histogram. For example, the high-frequency endpoint values 702 on the left of the histogram can represent many black pixels in the text character 708 and the high-frequency endpoint values 706 on the right of the histogram can represent the many white pixels in the background surrounding the text character 708. The midrange data values 704 in the histogram can represent various shades of gray shown along the edges of the text character 708 illustrated in FIG. 7A. As shown, the original image data 700 include no apparent gray or black data values in the white background surrounding the text character 708.

Figure 7B:
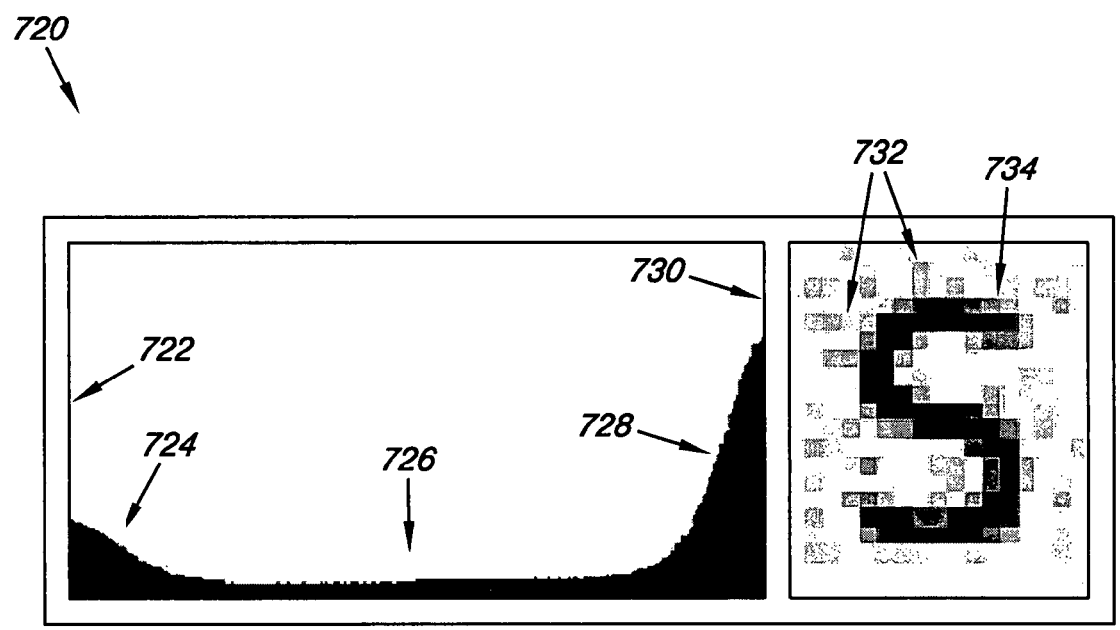

FIG. 7B illustrates an example of image data following compression and decompression 720 of original image data without utilizing embodiments of the present disclosure. Compressing/decompressing of original image data without pre-adjustment and/or post-adjustment, as described above, can yield an image with artifacts apparent to a user. The image data 720 illustrated in FIG. 7B show a histogram including endpoint values 722 at one end of a range of data values, a shoulder 724 reflecting a change in the average tone broadening the endpoint data values, a midrange 726 of data values, and a shoulder 728 reflecting a change in the average tone broadening the endpoint data values 630 at the other end of the range of data values.

FIG. 7B also illustrates a text character 734, which can be the same text character illustrated in FIG. 7A. The histogram shown in FIG. 7B can represent the range of data values in artifacts 732 introduced into and surrounding the text character 734 shown in the image to the right of the histogram. For example, the high-frequency endpoint values 722 on the left of the histogram can represent a reduced number of black pixels in the text character 734 and the high-frequency endpoint values 730 on the right of the histogram can represent a reduced number of white pixels in the background 732 surrounding the text character 734.

The data values in the shoulder 724 adjacent the endpoint data values 722 can represent a number of previously absent dark gray pixels that correspond to changes in the average tone of the black endpoint data values 722. Erroneous conversion of black pixels to various gray tones can become apparent near the periphery of and/or surrounding textual content and linear pattern content, as shown with the text character 734 in FIG. 7B. Hence, compression/decompression without pre-adjustment and/or post-adjustment can reduce the quality of textual content and linear pattern content in images.

Similarly, the data values in the shoulder 728 adjacent the endpoint data values 730 in FIG. 6B can represent a number of previously absent light gray pixels that correspond to changes in the average tone of the white endpoint data values 730. Erroneous conversion of white pixels to various gray tones can become apparent near the periphery of and/or surrounding textual content and linear pattern content, as shown in the background 732 surrounding the text character 734 in FIG. 7B. As shown in FIG. 7A, the original image data 700 include no apparent gray or black data values in the white background surrounding the text character 708. Hence, compression/decompression without pre-adjustment and/or post-adjustment can reduce the quality of background surrounding textual content and linear pattern content in images by introducing artifacts (e.g., ringing and/or mosquito noise).

Figure 7C:
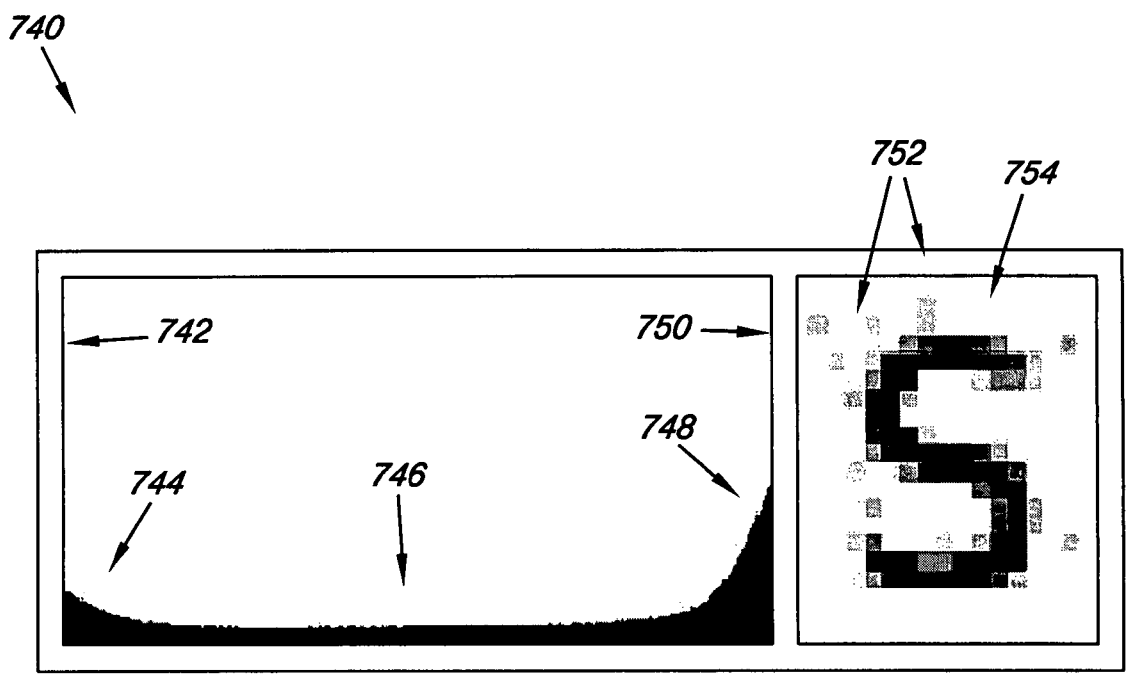

FIG. 7C illustrates an example of image data following compression and decompression 740 of original image data utilizing embodiments of the present disclosure. As described above, compressing/decompressing of original image data combined with pre-adjustment of the original image data, and, in some embodiments, post-adjustment associated with decompression thereof, can yield an image with reduction of artifacts apparent to a user. The image data 740 illustrated in FIG. 7C show a histogram including endpoint values 742 at one end of a range of data values, a shoulder 744, a midrange 746 of data values, and a shoulder 748 adjacent the endpoint data values 750 at the other end of the range of data values.

FIG. 7C also illustrates a text character 754, which can be the same text character illustrated in FIGS. 7A-B. The histogram shown in FIG. 7C can represent the range of data values in artifacts 752 introduced into and surrounding the text character 754 shown in the image to the right of the histogram. For example, the high-frequency endpoint values 742 on the left of the histogram can represent an increased number of black pixels in the text character 754 and the high-frequency endpoint values 750 on the right of the histogram can represent an increased number of white pixels in the background surrounding the text character 752 relative to FIG. 7B.

The data values in the shoulder 744 adjacent the endpoint data values 742 can represent a reduced number of dark gray pixels relative to the shoulder 724 illustrated in FIG. 7B. As illustrated in FIG. 7C, the number of black pixels associated with the text character 754 has increased and the number of gray pixels associated with the text character has decreased relative to text character 734 illustrated in FIG. 7B. Hence, compression/decompression in combination with pre-adjustment, and post-adjustment in some embodiments, can decrease reduction of quality of textual content and linear pattern content in images.

Similarly, the data values in the shoulder 748 adjacent the endpoint data values 750 in FIG. 7C can represent a reduced number of light gray pixels relative to the shoulder 728 illustrated in FIG. 7B. As illustrated in FIG. 7C, the number of gray pixels 752 in the background associated with the text character 754 has decreased relative to the background 732 surrounding the text character 734 illustrated in FIG. 7B and the number of gray pixels associated with the text character has decreased relative to text character 734 illustrated in FIG. 7B. Hence, compression/decompression in combination with pre-adjustment, and post-adjustment in some embodiments, can decrease reduction of the quality of background surrounding textual content and linear pattern content in images by introducing artifacts (e.g., ringing and/or mosquito noise).

Figure 7D:
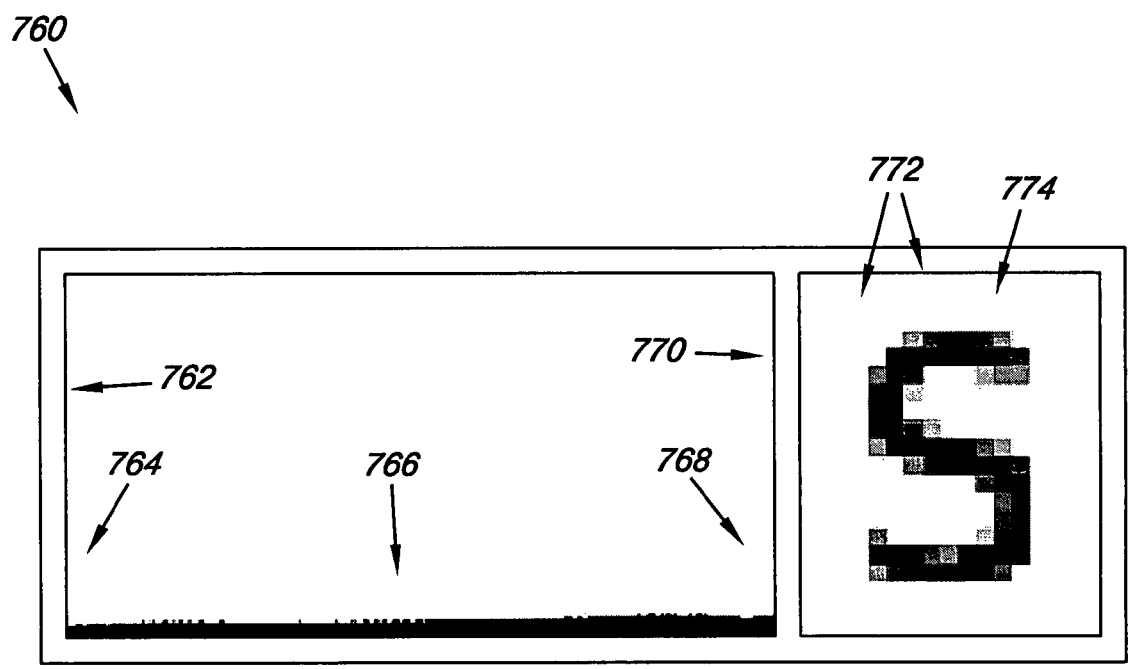

The level of pre-adjustment, and post-adjustment in some embodiments, can be determined automatically and/or based on user input. FIG. 7D illustrates another example of image data following compression and decompression 760 of original image data utilizing embodiments of the present disclosure. The image data 760 illustrated in FIG. 7D show a histogram including endpoint values 762 at one end of a range of data values, substantially no adjacent shoulder 764, a midrange 766 of data values, and substantially no shoulder 768 adjacent the endpoint data values 770 at the other end of the range of data values.

FIG. 7D also illustrates a text character 774, which can be the same text character illustrated in FIGS. 7A-C. The histogram shown in FIG. 7D can represent the range of data values in artifacts 772 introduced into and surrounding the text character 774 shown in the image to the right of the histogram. For example, the high-frequency endpoint values 762 on the left of the histogram can represent an increased number of black pixels in the text character 774 and the high-frequency endpoint values 770 on the right of the histogram can represent an increased number of white pixels in the background surrounding the text character 772 relative to FIGS. 7B-C.

The substantial lack of data values 764 adjacent the endpoint data values 762 can represent a reduced number of dark gray pixels relative to the shoulder 724 illustrated in FIG. 7B and the shoulder 744 illustrated in FIG. 7C. As illustrated in FIG. 7D, the number of black pixels associated with the text character 774 can increase and the number of gray pixels associated with the text character can decrease relative to text character 734 illustrated in FIG. 7B and text character 754 illustrated in FIG. 7C. Hence, compression/decompression in combination with pre-adjustment, and post-adjustment in some embodiments, can decrease reduction of quality of textual content and linear pattern content in images to a level determined automatically and/or by user input.

Similarly, the substantial lack of data values 768 adjacent the endpoint data values 770 in FIG. 7D can represent a reduced number of light gray pixels relative to the shoulder 748 illustrated in FIG. 7C. As illustrated in FIG. 7D, the number of white pixels associated with the background 772 surrounding the text character 774 can increase and the number of gray pixels associated with the background 772 surrounding the text character 772 can decrease relative to text character 734 illustrated in FIG. 7B and text character 754 illustrated in FIG. 7C. Hence, compression/decompression in combination with pre-adjustment, and post-adjustment in some embodiments, can decrease reduction of the quality of background surrounding textual content and linear pattern content in images by introducing artifacts (e.g., ringing and/or mosquito noise) to a level determined automatically and/or by user input.

Embodiments of the present disclosure can operate in combination with existent compression and/or decompression algorithms. As illustrated in FIG. 4A, pre-adjustment 405 of source image data 402 can be executed before the pre-adjusted image data is compressed using techniques appreciated by one of ordinary skill in the relevant art. Similarly, as illustrated in FIG. 4B, post-adjustment 455 of processed image data can be executed after decompression of the image data using techniques appreciated by one of ordinary skill in the relevant art. As such, embodiments of the present disclosure can interface and operate with existent compression/decompression algorithms (e.g., JPEG, GIF, and PNG, among others) and image viewers, and can include low computational manipulations on the compression side and/or decompression end of image processing.

An adjustment level selected based on an intended degree of artifact reduction can be determined with small impact on a degree of achievable image file size reduction. For example, the file size of the original image in FIG. 6A was calculated to use 1,000,017 bytes of memory and the file size of the image in FIG. 7B compressed using JPEG at Q50 was calculated to use 413,564 bytes of memory. The file size of the image in FIG. 7C compressed using JPEG at Q50 in combination with a selected level of adjustment according to embodiments of the present disclosure was calculated to use 406,791 bytes of memory. The file size of the image in FIG. 7D compressed using JPEG at Q50 in combination with another selected level of adjustment according to embodiments of the present disclosure was calculated to use 396,462 bytes of memory. Hence, the compressed image file size can be relatively unaffected by combining embodiments of the present disclosure with an existent compression algorithm, even when reducing artifacts in text content and/or linear pattern content to a level that is not apparent relative to an original image.

Figure 8:
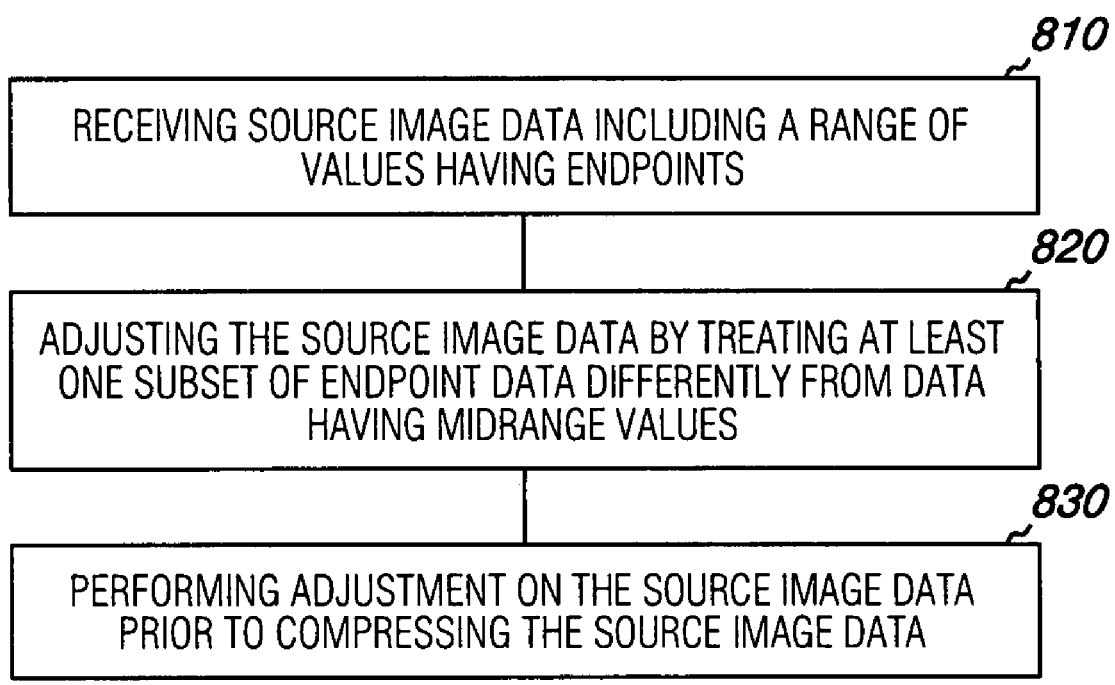
FIG. 8 is a block diagram illustrating a method of pre-adjustment of source image data according to an embodiment of the present disclosure.

FIG. 8 is a block diagram illustrating a method of pre-adjustment of source image data according to an embodiment of the present disclosure.

Unless explicitly stated, the method embodiments described herein are not constrained to a particular order or sequence. Additionally, some of the described method embodiments, or elements thereof, can occur or be performed at the same, or at least substantially the same, point in time.

Again, embodiments described herein can be performed using logic, software, hardware, application modules, and ASICs, or combinations of these elements, and the like, to perform the operations described herein. Embodiments as described herein are not limited to any particular operating environment or to software written in a particular programming language. The elements described can be resident on the systems, apparatuses, and/or devices shown herein, or otherwise. Logic suitable for performing embodiments of the present disclosure can be resident in one or more devices and/or locations. Processing devices used to execute operations described herein can include one or more individual modules that perform a number of functions, separate modules connected together, and/or independent modules.

The embodiment illustrated in FIG. 8 includes receiving source image data that includes a range of values having endpoints, as shown in block 810. As described above, source image data can be received from a number of sources. Block 820 of the embodiment shown in FIG. 8 includes adjusting the source image data by treating at least one subset of endpoint data differently from data having midrange values. Among other examples, FIG. 6A illustrates that at least one subset of endpoint data at the edges of the contrast reduced histogram remains substantially unaltered by pre-adjustment while the midrange points have been compacted. As shown in block 830, adjusting the source image data can be performed prior to compressing the source image data, as shown in FIGS. 6A and 6B, for example.

In some embodiments, adjusting the source image data can include using a point-process algorithm (e.g., performed with an ASIC having appropriate logic) that maintains values of the at least one subset of the endpoint data values and reduces contrast of the midrange values. Using a point-process algorithm can, in some embodiments, include using a look-up table that maintains values of at least one subset of the endpoint data values and reduces contrast of the midrange values. Adjusting source image data using a point-process algorithm can, in some embodiments, be used to treat endpoint data values differently from data having midrange values by creating at least one defined zone between at least one subset of the endpoint data values and a subset of reduced contrast midrange values prior to compressing the source image data. In some embodiments, a point-process algorithm can be used for removing data values from the at least one defined zone prior to compressing the source image data.

After decompressing the at least one defined zone from which data values were removed, the at least one defined zone can be used, in some embodiments, for identifying data values in the at least one subset of the endpoint data values artifactually altered by compressing the source image data. The identified artifactually altered endpoint data values can be adjusted by assigning the data values to a closest subset of the endpoint data values and/or a closest subset of midrange data values. In some embodiments, midrange values can be expanded to substantially restore the range of values between the endpoint data values as received in the source image data to maintain the source image data having midrange values substantially unadjusted.

In some embodiments, a point-process algorithm is used to assign a data value in the range adjacent a subset of endpoint data values to the subset of endpoint data values. The point-process algorithm can use a look-up table to assign the data value in the range adjacent a subset of endpoint data values.

Assigning the data value to a subset of endpoint data values can, in some embodiments, include removing the data value from the range adjacent the subset of endpoint data values after decompressing. As such, removing the data value from the range adjacent the subset of endpoint data values can include reducing an expanded range of endpoint data values resulting from compression.

A compression parameter affecting the endpoint data values associated with a textual content and/or a linear pattern content can, in various embodiments, be adjusted based on artifacts apparent in the textual content and/or the linear pattern content. An alternative to automatic adjustment can include utilizing user input for adjusting the compression parameter.

Reducing an expanded range of endpoint values resulting from compression can, in various embodiments, reduce artifacts (e.g., ringing and mosquito noise) associated with an image element (e.g., textual content and/or linear pattern content). Such reduction of artifacts can be executed in order to operate with an internet browser accessing a site displaying text and/or linear pattern content embedded in a rendered image and/or operate with an image processing application selected from a group including Adobe .pdf, and variations of JPEG, GIF, PNG, FIF, and LZW, among others.

Reducing artifacts can improve output quality of a text document, improve output quality of a portion of an image including text, improve output quality of an edge of a text document and an image, improve tone reproduction of a linear pattern in a text document and/or an image, and/or reduce compression loss associated with multiple compression cycles.

Although specific embodiments have been illustrated and described herein, those of ordinary skill in the relevant art will appreciate that an arrangement calculated to achieve the same techniques can be substituted for the specific embodiments shown. This disclosure is intended to cover all adaptations or variations of various embodiments of the present disclosure.

It is to be understood that the above description has been made in an illustrative fashion, and not a restrictive one. Combination of the above embodiments, and other embodiments not specifically described herein, will be apparent to those of ordinary skill in the relevant art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure need to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of image processing, comprising:
   using a processor for:
   receiving source image data including a range of values having endpoints;
   adjusting the source image data by treating at least one subset of endpoint data differently from data having midrange values, wherein adjusting the source image data is performed prior to compressing the source image data; and
   restoring a range of values between the endpoint data values after decompressing image data to maintain the midrange data values substantially unadjusted.

2. The method of claim 1, wherein the range of values includes measurements selected from a group including brightness, saturation, and chroma.

3. The method of claim 2, wherein a first subset of endpoint data includes using a value of 0 for each data point therein, a second subset of endpoint data includes using a value of 255 for each data point therein, and a subset of midrange values includes using a value from 1-254 for each point therein.

4. The method of claim 1, wherein the method includes compressing the source image data using a forward discrete cosine transform (FDCT) after adjusting the source image data.

5. The method of claim 1, wherein adjusting the source image data includes using a point-process algorithm that maintains values of the at least one subset of the endpoint data values and reduces contrast of the midrange values.

6. The method of claim 5, wherein using a point-process algorithm includes using a look-up table that maintains values of at least one subset of the endpoint data values and reduces contrast of the midrange values.

7. The method of claim 1, wherein the method includes adjusting a dequantization table associated with decompression to assign a data value in a range adjacent at least one subset of endpoint values to at least one subset of endpoint data values.

* * * * *

UNITED STATES PATENT AND TRADEMARK OFFICE
CERTIFICATE OF CORRECTION

| | | |
|---|---|---|
| PATENT NO. | : 7,813,588 B2 | Page 1 of 1 |
| APPLICATION NO. | : 11/796638 | |
| DATED | : October 12, 2010 | |
| INVENTOR(S) | : Brent M. Bradburn | |

It is certified that error appears in the above-identified patent and that said Letters Patent is hereby corrected as shown below:

In column 1, line 4, below "DATA" insert -- INTRODUCTION --.

Signed and Sealed this
Fifteenth Day of March, 2011

David J. Kappos
*Director of the United States Patent and Trademark Office*